United States Patent [19]

Korin

[11] Patent Number: 4,869,821

[45] Date of Patent: Sep. 26, 1989

[54] DRAINAGE DISC FOR MEMBRANE ASSEMBLY

[75] Inventor: Amos Korin, Weston, Conn.

[73] Assignee: W. R. Grace & Co.-Conn., Lexington, Mass.

[21] Appl. No.: 187,627

[22] Filed: Apr. 28, 1988

[51] Int. Cl.⁴ ............................................. B01D 13/00
[52] U.S. Cl. ........................... 210/321.64; 210/321.75; 210/321.84
[58] Field of Search ....................... 210/321.64, 321.71, 210/321.72, 321.75, 321.76, 321.84, 344, 445, 433.2, 739, 484

[56] References Cited

U.S. PATENT DOCUMENTS

| | | | |
|---|---|---|---|
| 3,615,024 | 10/1971 | Michaels | 210/490 |
| 3,994,799 | 11/1976 | Yao et al. | 210/321.64 |
| 4,264,447 | 4/1981 | Nicolet | 210/500.2 |
| 4,302,270 | 11/1981 | Nicolet | 156/290 |
| 4,749,481 | 6/1988 | Wheatley | 210/484 |
| 4,778,532 | 10/1988 | McConnell et al. | 210/739 |

OTHER PUBLICATIONS

Door-Oliver, "Iopor CIP Ultrafiltration Systems for the Food and Dairy Industries", Bulletin 10-5, 1979.
Dorr-Oliver, "Dorr-Oliver Ultrafiltration Systems", Bulletin 10-2US-0986, 1986.
Bulletin 10-6, "Series 'S' Ultrafiltration System for Feasibility Studies * Economic Modeling * Process Development * Product Development * Primary Processing", Dorr-Oliver Inc., 1969.

Primary Examiner—Frank Sever
Attorney, Agent, or Firm—Stacey L. Channing; William L. Baker

[57] ABSTRACT

A composite membrane assembly which comprises a membrane and a backing plate, wherein the backing plate has a socket disposed therein. The improvement comprises a drainage disc which fits into the socket and permits the drainage of filtrate there-through. The drainage disc has a circular groove, radial grooves, vertical grooves and a center hole. The drainage disc is composed of a material which has thermal expansion coefficient substantially similar to that of the backing plate.

26 Claims, 2 Drawing Sheets

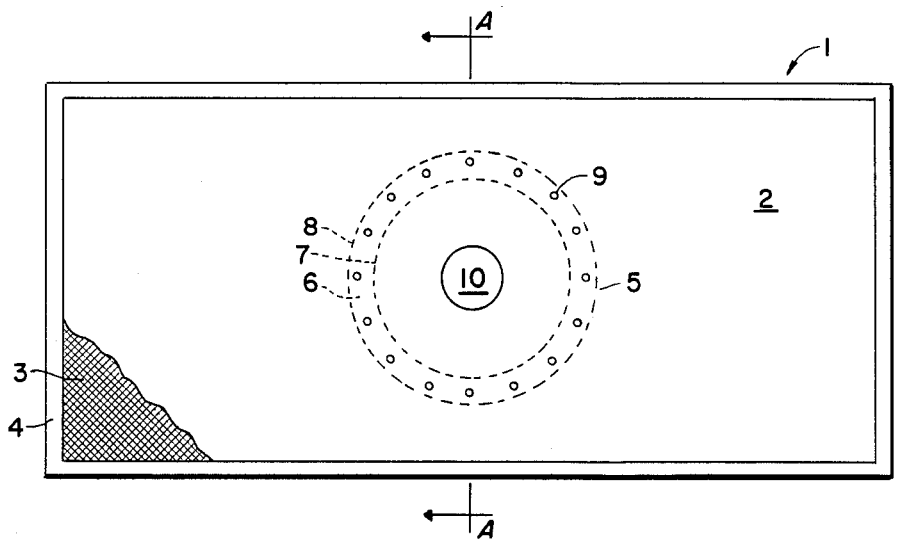
*Fig. 1*
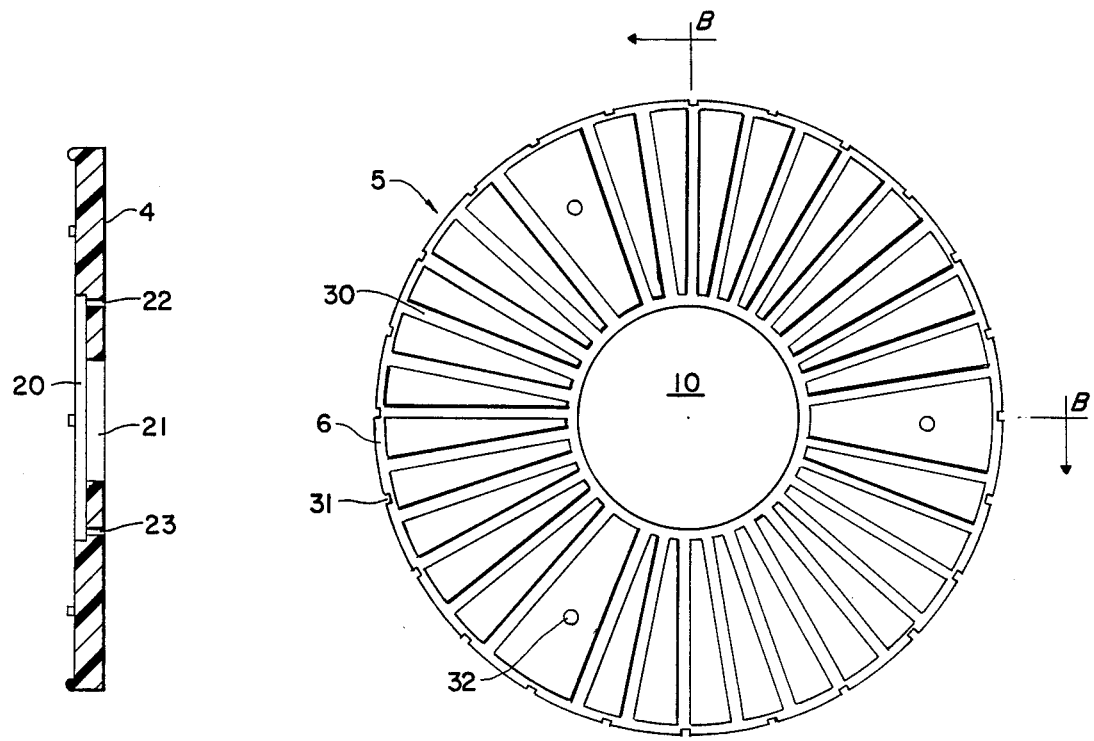
*Fig. 2*  *Fig. 3*

DRAINAGE DISC FOR MEMBRANE ASSEMBLY

BACKGROUND OF THE INVENTION

The invention provides an improved drainage disc for use in composite membrane assemblies. This improved drainage disc increases the through-put of filtrate and overcomes problems associated with thermal cycling.

Membrane assemblies are used in a variety of liquid-solid separation processes. Membrane assemblies may be used either by themselves or in conjunction with additional membrane units for the retention of soluble macromolecules or suspended colloidal particles. Soluble macromolecules are proteins, polypeptides, polysaccharides, oligosaccharides, polyphenolics, synthetic water soluble polymers, and the like. Examples of suspended colloidal particles are pigments, dispersed dyes, oil-in-water emulsion globules, fat emulsions, polymer latices and dispersions, metal/non-metals/oxides/salts, dirt, soils, clays, micro-organisms, and plant/animal cellular materials.

Membrane assemblies are typically in the form of rectangular plates consisting of a plastic backing plate with a membrane permanently attached to each side. The membrane is cast on a fine support scrim, and a layer of coarse textured, non-woven fabric such as, spun-bonded polyester or polyolefin, is placed between the scrim and backing plate to allow flow of permeate or filtrate to an extraction point with a minimum of resistance. The membrane is either an ultrafiltration, microporous, or reverse-osmosis membrane. The filtrate is collected and removed from each system. A typical ultrafiltration system is disclosed in Dorr-Oliver Inc., Bulletin Number 10-6, entitled "Series 'S' Ultrafiltration System for Feasibility Studies-Economic Modeling-Process Development-Product Development-Primary Processing".

Early on it was recognized that drainage of the filtrate from the area between the membrane and backing plate was quite important to the application of membrane assemblies in the separation of large quantities of particle slurries.

In the past, the membrane was heat sealed to an impervious backing plate along its edges and about a center hole in the plate. The filtrate was evacuated through the drainage mat or scrim away from the center hole and out along the ends of the backing plate. This design is described in U.S. Pat. Nos. 4,264,447 (Nicolet) and 4,302,270 (Nicolet).

It was later determined that the application of a thin wafer around the center hole of the backing plate could provide ready drainage of the filtrate through the center hole and out of the membrane assembly. In accordance with the thin wafer design, four grooves were carved into the backing plate toward the center hole. Instead of heat sealing about the center hole as done in the Nicolet patents, a thin wafer of pure polyethylene or polypropylene was disposed on both sides of the backing plate. The thin wafers were donut shaped and heat sealed to membranes. The thin wafers were not attached to the backing plate, but were permitted to float as filtrate passed between the wafers and the backing plate into the center hole.

One problem with using a thin wafer is that the wafer itself is temperature sensitive and has a tendency to crack during thermal cycling, such as sterilization or when a heated filtrate is passed there-between. Also, due to the desired thinness of the wafer it is difficult to mold them using mineral-filled polymers, thus restricting application and design. It was also found to be labor consuming to heat seal wafers to each membrane of every membrane assembly.

The present inventor has developed a novel drainage disc for use in membrane assemblies which overcomes the disadvantages set forth above with regard to the prior art. In particular, it was discovered that the cracking of the thin wafer was a result of different expansion coefficients between the materials used to make the thin wafer and backing plate. The thin wafer is composed of pure polyethylene or polypropylene, whereas the backing plate was composed of mineral-filled polyethylene or polypropylene. To overcome this shortcoming, the present inventor has designed a new drainage disc formed of a material having a thermal expansion coefficient substantially the same as the material used in making the backing plate. By using materials having similar expansion coefficients, a drainage disc has been designed which avoids cracking during thermal cycling.

Also, an increase in filtrate through-put up to 20% has been observed when using the new drainage disc of the present invention. Additional advantages of the present invention shall become apparent as described below.

SUMMARY OF THE INVENTION

It is the primary object of the present invention to provide an improved drainage disc for use in a membrane assembly. The composite membrane assembly comprises a membrane, a drainage grid, and a backing plate. The membrane may be either an ultrafiltration, microporous, or reverse-osmosis membrane. The backing plate has a socket disposed therein, and the drainage grid is interposed between the ultrafiltration membrane and the backing plate. Instead of or in addition to having a drainage grid, the backing plate may be formed with a textured surface so as to permit drainage of filtrate. The novel drainage disc fits into the socket and permits the drainage of filtrate there-through. The drainage disc comprises radial grooves, vertical grooves, a center hole and at least one circular groove.

According to the present invention the drainage disc is disposed in the socket such that the circular and radial grooves are opposite the backing plate. The design of the disc is such that the circular groove is disposed about the periphery of the disc, the radial grooves are disposed between the circular groove and the center hole, and the vertical grooves are disposed so as to connect the circular groove with the space formed between the membrane and the backing plate. The membrane is joined to the surface of the drainage disc opposite to that of the circular and radial grooves.

An additional object of the present invention is that the drainage disc be composed of a material which has a thermal expansion coefficient substantially the same as that of the backing plate. The drainage disc may comprise a material selected from the group consisting of mineral-filled polyethylene, mineral-filled polypropylene, mineral-filled polysulfone, and mineral-filled polyester and combinations thereof.

The configuration of the membrane assembly in accordance with the present invention is such that the filtrate which passes through the membrane flows between the membrane and the backing plate by means of either a drainage grid or textured-surface backing plate, the filtrate thereafter flowing into the vertical grooves of the drainage disc to the circular and radial grooves, and out through the center hole. The membrane and the drainage disc are joined by means of heat and pressure sealing. It is preferable that the drainage disc include thirty-three (33) radial grooves, twenty-four (24) vertical grooves, and at least one (1) circular groove. For ease of manufacture, the drainage disc fits easily into the socket of the backing plate by either snapping notch or ultrasonic welding.

The preferred embodiment of the present invention provides a composite membrane assembly comprising a first membrane, a second membrane, and a backing plate. The backing plate has a socket disposed therein. Either the backing plate has a textured-surface on both sides or drainage grids are used to assist in moving filtrate through the membrane assembly or both a textured surface and drainage grids are used. If drainage grids are used, then a first drainage grid is interposed between the first membrane and a first surface of a backing plate, and a second drainage grid is interposed between the second membrane and a second surface of the backing plate. Similar to above, the drainage disc fits into the socket and permits the drainage of filtrate there-through. The drainage disc is disposed on the socket of the backing plate such that the circular and radial grooves are directly facing the first surface of the backing plate. In accordance with this embodiment, through-put holes are formed in the backing plate so as to connect the circular groove of the drainage disc with the space formed between the second membrane and the backing plate.

The filtrate passing through the first membrane flows between the first membrane and the backing plate by means of either a first drainage grid and/or textured-surface. Thereafter, the filtrate flows into the vertical grooves of the drainage disc to the circular and radial grooves, and out through the center hole. The filtrate which passes through the second membrane flows between the second membrane and backing plate by means of either a second drainage grid and/or textured-surface. Thereafter, the filtrate from the second membrane flows into the through-put holes in the backing plate to the circular and radial grooves of the drainage disc, and out through the center hole. Typically, the backing plate will have sixteen (16) through-put holes formed therein.

The present invention may also include many additional features which shall be further described below.

BRIEF DESCRIPTION OF THE DRAWINGS

FIG. 1 is a top planar view of a composite membrane assembly in accordance with the present invention;

FIG. 2 is a cross-sectional view along line A—A of FIG. 1;

FIG. 3 is a top planar view of a drainage disc in accordance with the present invention;

DESCRIPTION OF THE PREFERRED EMBODIMENTS

Figure 5:
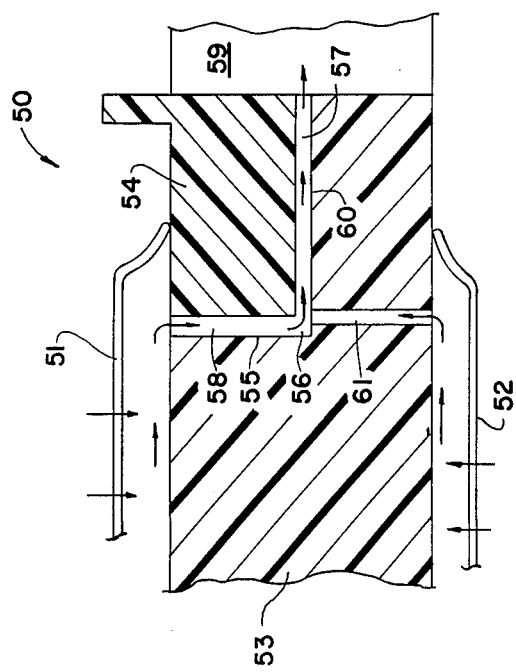
FIG. 5 is a cross-sectional view of a composite membrane assembly in accordance with the present invention which contains two membranes and through-put holes.

The present invention provides a novel composite membrane assembly for use in filtering liquids from slurries of suspended solids. In particular, a unique drainage disc has been incorporated into the membrane assembly which is not sensitive to thermal cycling, avoids cracking, increases filtrate through-put, permits easy manufacture, and is readily moldable into desired shapes.

The drainage disc comprises a donut-shaped polymer disc with radial grooves, vertical grooves, a center hole, and at least one circular groove. The design of the disc is such that the circular groove is disposed about the periphery of the polymer disc, the radial grooves are disposed between the circular groove and the center hole, and the vertical grooves are disposed vertically through-out the width of the polymer disc and in contact with the circular groove. Although any number of grooves may be used, it is preferable that the drainage disc include thirty-three (33) radial grooves, twenty-four (24) vertical grooves, and at least one circular groove. Application of this drainage disc in a composite membrane assembly is best described by referring to the drawings.

FIG. 1 illustrates a composite membrane assembly 1 having membrane 2, drainage grid 3, and backing plate 4. Backing plate 4 may be formed having a textured-surface, thus avoiding the need for drainage grid 3. The textured surface preferably has peaks and valleys, similar to an orange peel surface, and the distance between the peaks are preferably less than 30 mils and more preferably between 10–15 mils. The depth from the peaks to the valleys in the preferred surface is approximately 6½ mils. One method of providing such a textured surface would be by photoetching a textured pattern onto a substrate to form a mold, which mold is them used to produce the textured surface. A detailed discussion of the formation of an ultrafiltration membrane assembly is set forth in U.S. Pat. Nos. 4,264,447 and 4,302,270, the teachings of which are incorporated herein by reference. The membrane can be either an ultrafiltration, microporous or reverse osmosis membrane.

In the membrane assembly illustrated, membrane 2 is composed of a relatively high temperature polyethersulfone polymer having a polymer melt temperature in excess of 150° C. Such a polyethersulfone polymer is sold under the trademark VICTREX by the ICI Corporation. The polymer melt temperature of this product is in the range from about 350° C. to up to about 400° C. The ultrafiltration membrane is cast from a solution of the polyethersulfone polymer in sheet form on a polyethylene paper using methods well known in the art, see U.S. Pat. No. 3,615,024, issued Oct. 26, 1971 to A. S. Michaels. The polyethylene paper on which the ultrafiltration membrane is cast is spun bound from filamentous polyethylene, such as that sold under the trademark TYVEK by the DuPont Corporation.

Drainage grid 3 is a coarse-textured non-woven fabric, such as, a spun bound polypropylene polymer sheet. Polypropylene polymer sheet sold under the trademark TYPAR by the DuPont Corporation has been found to be suitable for this purpose.

Backing plate 4 is typically a solid, essentially non-porous, member which is preferably composed of a mineral-filled material, such as, polyethylene, polypropylene, polysulfone or polyester. A satisfactory talc-filled polyethylene is sold under the trademark PLAS-LODE by the Fiberfil Division of Dart Industries, Inc.

Membrane 2 is attached to backing plate 4 by heat and pressure sealing, wherein the membrane support and backing plate 4 have lower polymer melt temperatures than membrane 2.

Although not shown in FIG. 1, backing plate 4 has a socket disposed therein for insertion of drainage disc 5 which is depicted by dashed lines since it is actually covered with membrane 2 from the top planar view. In FIG. 1, circular groove 6 appears between dashed lines 7 and 8. Through-put holes 9 are formed in backing plate 4 to permit the removal of filtrate from the opposite side of assembly 1. The filtrate is evacuated from the membrane assembly 1 by drainage disc 5 through center hole 10.

Although any number of through-put holes 9 may be used, it is preferably that sixteen (16) through-put holes 9 penetrate entirely through backing plate 4. Moreover, it is preferable that through-put holes 9 be disposed equally, approximately every 22.5°, about backing plate 4, and positioned at or near circular groove 6 to permit easy drainage from assembly 1. Moreover, through-put holes 9 preferably have a diameter of about 0.03 inches.

FIG. 2 is a cross-sectional view across line A—A of FIG. 1. Membrane 2, drainage grid 3 and drainage disc 5 have been eliminated from FIG. 2 so that the socket in backing plate 4 and through-put holes 9 may be better described. Thus, FIG. 2 shows backing plate 4 which is typically made up of a mineral-filled polyethylene or polypropylene. Socket 20 is cut out of backing plate 4 such that the drainage disc may fit securely therein. Socket 20 also includes a center hole 21 which has similar dimensions to the center hole of the drainage disc.

FIG. 2 also shows through-put holes 22 and 23 which permit drainage of filtrate from the rear surface of backing plate 4 by penetrating from the back side of backing plate 4 through to socket 20.

The drainage disc fits into socket 20 and may be secured by any means, such as, snapping notch or ultrasonic welding. Otherwise the drainage disc may simply be left floating in socket 20.

FIG. 3 depicts drainage disc 5 made in accordance with the present invention. Drainage disc 5 is a donut-shaped polymer disc with a circular groove 6, radial grooves 30, vertical grooves 31 and center hole 10. The design of disc 5 is such that circular groove 6 is disposed about the periphery of drainage disc 5, radial grooves 30 are disposed between circular groove 6 and center hole 10, and vertical grooves 31 are disposed vertically throughout the width of drainage 10 and in contact with circular groove 6.

Preferably, there are twenty-four (24) equally spaced vertical grooves 31 positioned about drainage disc 5. That is, vertical grooves 31 are spaced approximately 15° apart along the circumference of drainage disc 5 and preferably have a width of approximately 0.025 inches. There are approximately thirty-three (33) radial grooves positioned approximately 10° apart about drainage disc 5 which preferably have a width of approximately 0.04 inches. Although a specific number of grooves are set forth above, it is clear that any number of groovs may be used with any kind of spacing.

In order to prevent cracking, it is particularly desirable to provide a drainage disc having a material composition which has a thermal expansion coefficient substantially similar to that of the backing plate. Even more preferably, would be a drainage disc composed of the same material as the backing plate. The drainage disc may be composed of a material selected from the group consisting of mineral-filled polyethylene, mineral-filled polypropylene, mineral-filled polysulfone, and mineral-filled polyester.

Energy directors 32 are disposed about drainage disc 5 to assist in the ultrasonic welding of drainage disc 5 to the socket shown in FIG. 2. Drainage disc 5 may be formed by any conventional polymer injection mold technique.

Figure 4:
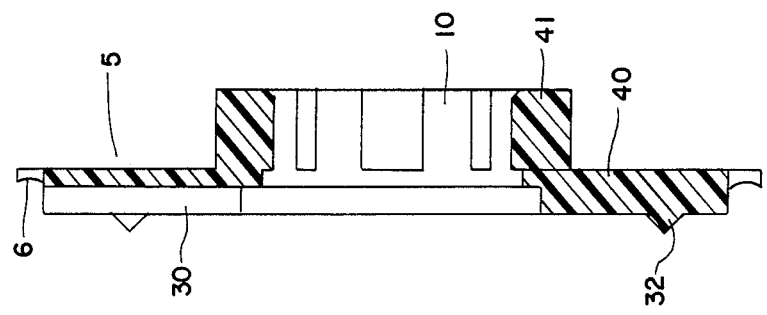
FIG. 4 is a cross-sectional view across line B—B of FIG. 3.

FIG. 4 is a cross-sectional view along line B—B of FIG. 3. FIG. 4 depicts drainage disc 5 formed of a thin donut-shaped substrate 40 in which radial grooves 30 and circular groove 6 are formed therein. Substrate 40 also has energy directors 32 disposed thereon to effect ultrasonic welding of drainage disc 5 to the socket shown in FIG. 2. Preferably, both radial grooves 30 and circular groove 6 have approximately a depth of 0.03 inches. Substrate 40 preferably has a width of approximately 0.075 inches and a diameter of approximately 1.73 inches. Circular groove 6 preferably has a width of approximately 0.05 inches.

FIG. 4 also shows center hole 10 formed through substrate 40 and lip 41.

FIG. 5 is extremely useful in understanding the flow of filtrate through the membrane assembly designed in accordance with the present invention. Membrane assembly 50 includes a first membrane 51 and a second membrane 52 composed of a polyethersulfone polymer cast in sheet form on a polyethylene paper. A backing plate 53 is a solid, essentially non-porous, mineral-filled polyethylene injection molded member. Backing plate 53 is disposed between first membrane 51 and second membrane 52. Although not shown in FIG. 5, filtrate removal from membrane assembly 50 is aided by either drainage grids being disposed between backing plate 53, and membranes 51 and 52, or backing plate 53 being formed with a textured-surface or both. Drainage disc 54 is fit into socket 55 of backing plate 53 so as to permit the drainage of filtrate thereto. Drainage disc 54 has a circular groove 56, radial grooves 57, vertical grooves 58, and center hole 59.

In accordance with this invention drainage disc 54 is disposed in socket 55 such that circular groove 56 and radial grooves 57 are opposite a first surface 60 of backing plate 53. Circular groove 56 is positioned about the periphery of drainage disc 54, radial grooves 57 are positioned between circular groove 56 and center hole 59, and vertical grooves 58 are positioned so as to connect circular grooves 56 with the space formed between first membrane 51 and backing plate 53. First membrane 51 is joined to the surface of drainage disc 54 opposite to that of circular groove 56 and radial grooves 57 by means of heat sealing.

Through-put holes 61 penetrate entirely through backing plate 53 so as to connect circular groove 56 with the space formed between second membrane 52 and backing plate 53. Second membrane 52 is attached to backing plate 53 near the periphery of the socket.

Referring to FIG. 5, filtrate passes through first membrane 51 and flows between membrane 51 and backing plate 53 by means of a first drainage grid and/or textured surface of backing plate 53 (not shown). The filtrate then flows into vertical grooves 58 of drainage disc 54 to circular groove 56 and radial grooves 57, and finally out of membrane assembly 50 via center hole 59.

Filtrate may also pass through second membrane 52 and flow between membrane 52 and backing plate 53 by means of a second drainage grid and/or textured surface of backing plate 53 (not shown). filtrate which passes through membrane 52 thereafter flows via through-put holes 61 into circular groove 56 and radial grooves 57.

While I have shown and described several embodiments in accordance with this invention, it is to be clearly understood that the same are susceptible to numerous changes and modifications apparent to one skilled in the art. Therefore, I do not wish to be limited to the details shown and described but intend to show all changes and modifications which come within the scope of the appended claims.

What is claimed is:

1. A composite membrane assembly which comprises a membrane and a backing plate:
   wherein the improvement comprises a an alternative to a thin wafer comprising drainage disc which fits into a socket formed in said backing plate and permits the drainage of filtrate there-through, said drainage disc comprising radial grooves, vertical grooves, a center hole, and at least one circular groove,
   said drainage disc being disposed in said socket such that said circular and radial grooves are opposite said backing plate, said circular groove being disposed about the periphery of said drainage disc, said radial grooves being disposed between said circular groove and said center hole, and said vertical grooves being disposed so as to connect said circular groove with the space formed between said membrane and said backing plate, and
   said membrane being joined to the surface of said drainage disc opposite to that of said circular and radial grooves.

2. The composite membrane assembly according to claim 1, wherein said membrane is either an ultrafiltration, microporous, or reverse-osmosis membrane.

3. The composite membrane assembly according to claim 1, wherein said backing plate has a textured-surface to assist in the drainage of filtrate.

4. The composite membrane assembly according to claim 1, wherein a drainage grid is interposed between said membrane and said backing plate.

5. The composite membrane assembly according to claim 1, wherein said drainage disc is composed of a material which as a thermal expansion coefficient substantially the same as that of said backing plate.

6. The composite membrane assembly according to claim 5, wherein said drainage disc is composed of the same material as said backing plate.

7. The composite membrane assembly according to claim 1, wherein said drainage disc is composed of a material selected from the group consisting of mineral-filled polyethylene, mineral-filled polypropylene, mineral-filled polysulfone, mineral-filled polyester, and combinations thereof.

8. The composite membrane assembly according to claim 1, wherein said assembly is configured such that filtrate which passes through said membrane flows between said membrane and said backing plate, said filtrate thereafter flowing into said vertical grooves of said drainage disc to said circular groove and said radial grooves, and out through said center hole.

9. The composite membrane assembly according to claim 1, wherein said membrane and said drainage disc are joined by means of heat and pressure.

10. The composite membrane assembly according to claim 1, wherein said drainage disc includes thirty-three (33) radial grooves, twenty-four (24) vertical grooves, and at least one (1) circular groove.

11. The composite membrane assembly according to claim 1, wherein said drainage disc fits into said socket by either snapping notch or ultrasonic welding.

12. A composite membrane assembly which comprises a first membrane, a second membrane, and a backing plate,
    wherein the improvement comprises an alternative to a thin wafer comprising a drainage disc which fits into a socket formed in said backing plate and permits the drainage of filtrate there-through, said drainage disc comprising radial grooves, vertical grooves, a center hole, and at least one circular groove,
    said drainage disc being disposed in said socket such that said circular and radial grooves are opposite a first surface of said backing plate, said circular groove being disposed about the periphery of said drainage disc, said radial grooves being disposed between said circular groove and said center hole, and said vertical grooves being disposed so as to connect said circular groove with the space formed between said first membrane and said backing plate,
    said first membrane being joined to the surface of said drainage disc opposite to that of the circular and radial grooves, and said second membrane being joined to a second surface of said backing plate, and
    through-put holes being disposed in said backing plate so as to connect said circular grooves with the space formed between said second membrane and said backing plate.

13. The composite membrane assembly according to claim 12, wherein said first and second membranes are either ultrafiltration, microporous, or reverse-osmosis membranes.

14. The composite membrane assembly according to claim 12, wherein said backing plate has a textured-surface on both sides to assist in the drainage of filtrate.

15. The composite membrane assembly according to claim 12, wherein a first drainage grid is interposed between said first membrane and said first surface of said backing plate, and a second drainage grid is interposed between said second membrane and said second surface of said backing plate.

16. The composite membrane assembly according to claim 12, wherein said second membrane is joined to said backing plate near the periphery of said socket.

17. The composite membrane assembly according to claim 12, wherein said drainage disc is composed of a material which has a thermal expansion coefficient substantially the same as that of said backing plate.

18. The composite membrane assembly according to claim 17, wherein said drainage disc is composed of the same material as said backing plate.

19. The composite membrane assembly according to claim 12, wherein said drainage disc is composed of a material selected from the group consisting of mineral-filled polyethylene, mineral-filled polypropylene, mineral-filled polysulfone, mineral-filled polyester, and combinations thereof.

20. The composite membrane assembly according to claim 12, wherein said assembly is configured such that filtrate which passes through said first membrane flows between said first membrane and said backing plate, the filtrate thereafter flowing into said vertical grooves of said drainage disc to said circular groove and said radial grooves, and out through said center hole; and filtrate which passes through said second membrane flows between said second membrane and said backing plate, the filtrate thereafter flows through said through-put holes, to said circular groove and said radial grooves, and out through said center hole.

21. The composite membrane assembly according to claim 12, wherein said first membrane and said drainage disc are joined by means of heat and pressure.

22. The composite membrane assembly according to claim 12, wherein said drainage disc includes thirty-three (33) radial grooves, twenty-four (24) vertical grooves, and at least one (1) circular groove.

23. The composite membrane assembly according to claim 12, wherein said drainage disc fits into said socket by either snapping notch or ultrasonic welding.

24. The composite membrane assembly according to claim 12, wherein said backing plate has sixteen (16) through-put holes.

25. A polymer drainage disc comprising an alternative to a thin wafer comprising a donut-shaped polymer disc with a circular groove, radial grooves, vertical grooves and a center hole, said circular groove being disposed about the periphery of said polymer disc, said radial grooves being disposed between said circular groove and said center hole, and said vertical grooves being disposed vertically throughout the width of said polymer disc and in contact with said circular groove.

26. The polymer drainage disc according to claim 25, wherein said polymer disc includes thirty-three (33) radial grooves, twenty-four (24) vertical grooves, and at least one (1) circular groove.

* * * * *